Figure 1:
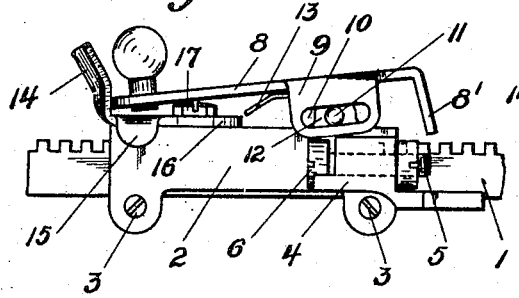
Figure 2:
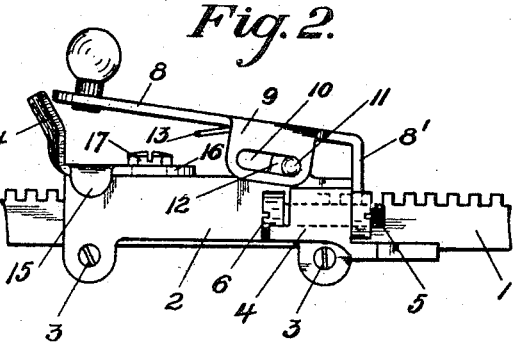
Figure 3:
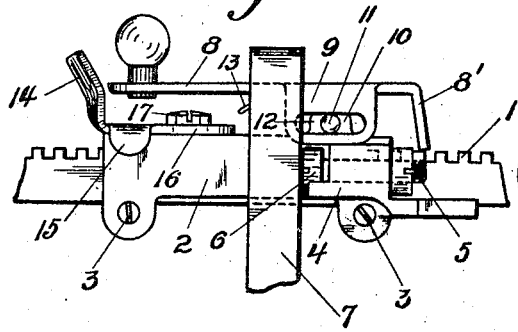
Figure 4:
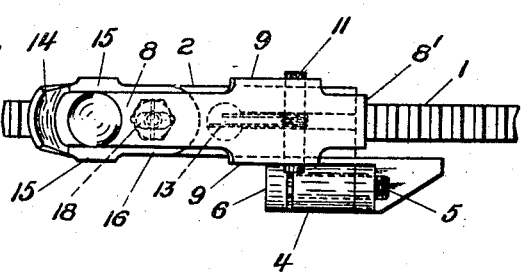

E. BUCKINGHAM.
MARGIN STOP DEVICE.
APPLICATION FILED MAY 4, 1912.

1,053,153.

Patented Feb. 18, 1913.

WITNESSES:
L. F. Browning
John Darby

INVENTOR
Earle Buckingham
BY
Edward C. Davidson
ATTORNEY

UNITED STATES PATENT OFFICE.

EARLE BUCKINGHAM, OF HARTFORD, CONNECTICUT, ASSIGNOR TO ROYAL TYPEWRITER COMPANY, OF NEW YORK, N. Y., A CORPORATION OF NEW JERSEY.

MARGIN-STOP DEVICE.

1,053,153.   Specification of Letters Patent.   Patented Feb. 18, 1913.

Application filed May 4, 1912.   Serial No. 695,086.

*To all whom it may concern:*

Be it known that I, EARLE BUCKINGHAM, a citizen of the United States of America, residing at Hartford, county of Hartford, State of Connecticut, have invented a certain new and useful Improvement in Margin-Stop Devices, of which the following is a specification.

This invention relates to margin stop devices capable of performing the function of the margin stop devices disclosed in the patent of L. C. Myers, No. 947,450, granted January 25, 1910 and in the patent of Edward B. Hess, No. 955964 granted April 26, 1910. The purpose of the devices of these patents is to afford a convenient means for automatically seating the stop surfaces of the carriage stop and coöperating frame stop a distance away from each other equal to one letter space. The purpose of doing this is set forth in full in the above mentioned Patent No. 947450 and need not therefore be repeated here. In the last named patent, the carriage stop is provided with a supplemental or gage stop that is normally one letter space in advance of the stop proper and is utilized for the purpose of setting the carriage stop. The gage stop is, however, yieldingly mounted upon the carriage stop and is pressed back by the stress exerted by the carriage spring until the frame stop abuts against the permanent stop surface of the carriage stop device.

In the Hess patent above mentioned the supplemental or gage stop is normally in inoperative position but is advanced in front of the carriage stop surface when the operator grasps the carriage stop to adjust it with respect to the frame stop and after the adjustment the gage stop automatically recedes to inoperative position.

In this invention the frame movable on the carriage stop bar and provided with the stop surface that coöperates with the frame stop is movable relatively to the latch that is mounted upon it and that engages the teeth of the stop bar. This movement of the frame relatively to its latch is a definite one and may be of such extent as is desired for any particular purpose. As shown in the present instance, such movement is equal to one letter space. The organization is such that when the stop surface of the carriage stop is moved into contact with the center or frame stop, the frame or body of the carriage stop is held against movement relatively to the latch which it carries. When, however, the latch is caused to engage a recess in the carriage stop bar to thereby set the stop in the desired relation to the bar, the frame or body is then free to move one letter space before it is positively arrested. Thus, when the carriage stop is adjusted by setting its stop surface against the frame stop in the subsequent writing operation, the carriage stop comes in contact with the fixed center stop and yields relatively to its latch which latch determines its position on the stop bar, and in yielding it moves a distance equal to one letter space.

Figure 5:
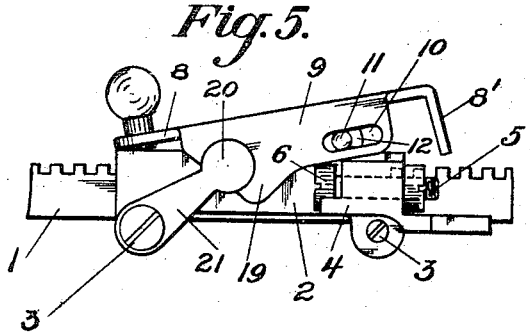
Figure 6:
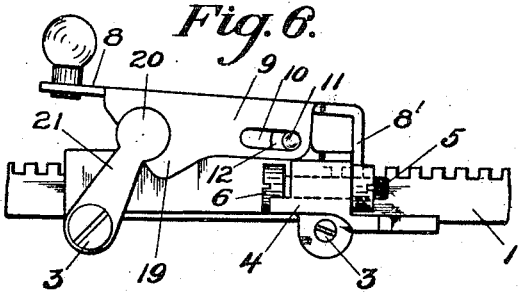
Figure 7:
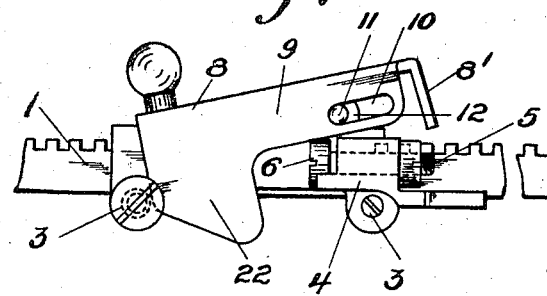
Figure 8:
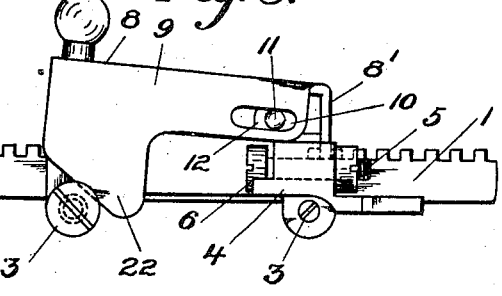

In the accompanying drawings: Figures 1, 2, 3 and 4 show one form of the invention,—Figs. 1, 2 and 3 being side elevations and Fig. 4 a plan view. Figs. 5 and 6 show a modification of the construction: and Figs. 7 and 8 show a further modification.

Referring first to Figs. 1, 2, 3 and 4, 1 indicates the ordinary toothed carriage stop bar having equally spaced recesses in its upper face.

2 is the frame of a carriage stop,—for instance a margin stop. This frame straddles the rock bar and is held thereon by cross pins or screws 3, 3 extending under the bar between lugs on the sides of the frame 2. In a lateral projection 4 on the side of the frame is an adjustable screw bolt 5 arranged parallel with the bar and the head 6 of which constitutes the stop surface that coöperates with the center or frame stop 7 to arrest the carriage. This construction and arrangement is well understood. Mounted on the top of the stop frame 2 is a latch 8 having at one end a finger piece, and at the other a down turned portion 8' adapted to engage the recesses in the top of the bar 1. At the sides of the latch are downwardly extending lugs or flanges 9 having therein horizontally disposed slots 10 that embrace the ends of a cross pin 11 secured in opposite lugs 12 extending upwardly at the sides of the body 2. A spring is coiled around the cross pin 11 and its end 13 tends by its reaction to throw the end 8' of the latch downwardly into engagement with the stop bar.

On the frame opposite the finger piece end of the latch 8 is an upright cam plate 14, the base portion of which has ears 15 that embrace the sides of the body 2, and an apertured portion 16 through which passes a screw bolt 17 that serves to firmly attach the cam plate to the top of the body 2. The aperture in the base plate is in the form of an elongated slot 18 (Fig. 4) making it possible to adjust the upright cam 14 toward and from the finger piece end of the latch.

The operation is as follows: When the finger piece end of the latch is pressed downwardly, its end acts upon the cam plate 14 to move the stop frame or body 2, relatively to the latch, to the left as viewed in the drawing. This will bring the cross pin 11 about in the middle of the slots 10 in the form in which the invention is shown. The stop body and latch may now be moved until the stop face 6 is in contact with the fixed or center stop 7 and the latch may then be released so that its end 8' will engage a recess in the top of the stop bar. The effect of this adjustment is in fact to set the stop face 6 a predetermined distance away from the center stop (for instance one letter space) for the reason that in the subsequent operation of the machine when the stop surface 6 comes against the center stop the frame 2 of the carriage stop will yield and it moves to the right (as viewed in the drawing) until the cross pin 11 is in the right hand end of the slots 10 (Fig. 2) when movement of the carriage will be positively arrested.

In the modification shown in Figs. 5 and 6, the latch has on one side (that nearest the observer in the form of the device shown) an extension 19 of the flange 9 toward the finger piece end of the latch. The end edge of this extension 19 is disposed at an angle of about forty-five degrees to the stop bar and in it is a circular recess occupied by the circular head 20 of an arm swinging on the cross screw or bolt 3. The behavior of the parts is the same as that described in connection with Figs. 1 to 4. When the finger piece end of the latch is depressed, the parts are in the position indicated in Fig. 5; and, in this position, movement of the body or frame 2 of the carriage stop to the right cannot occur because movement is prevented by the arm 21. When, however, the latch is allowed to drop so as just to enter a recess in the rack bar, the body 2 may be forced to the right, the result being that the finger piece end of the latch will be thrown upwardly and its operating end 8' downwardly more deeply into the recess in the bar. The parts may be so proportioned that this movement of the body 2 relatively to the latch may be of such extent as is desired, for instance, a distance of one letter space.

In the modified construction shown in Figs. 7 and 8, the operation is the same as that indicated in Figs. 1 to 4 and the construction differs only in that there is a flange cam 22 extending down from the side of the latch and working against the cross pin 3. When the finger piece end of the latch is depressed, the effect is to draw the body 2 to the left until, for instance, the end of the cross pin 11 is in the left hand end of the slots 10. The stop surface 6 may now be set against the center stop and the latch be allowed to enter a recess in the stop bar. Subsequently, contact of the stop surface against the center stop under stress of the carriage spring will cause the stop to move to the right as viewed in the drawing a determined distance, for instance, a distance equal to one letter space.

Several modifications of construction have been shown all of which are efficient and practicable but of those illustrated, the one preferred is that shown in Figs. 1 to 4. The invention, however, may be embodied in various forms by those skilled in the art.

So far as I am aware, it is broadly new in a device of this kind to have the body of the carriage stop movable relatively to the rack engaging latch which it carries.

I claim:

1. In stop devices adapted to arrest the movement of a typewriter carriage, a stop frame carrying a stop surface and also a latch adapted to engage a stop bar and a sliding and rocking connection between the frame and latch that permits movement of the frame relatively to the latch.

2. In stop devices adapted to arrest the movement of a typewriter carriage, a stop frame carrying a stop surface and also a latch adapted to engage a stop bar, a pin-and-slot connection between the frame and latch that permits movement of the frame relatively to the latch whereby when the latch is engaged with the stop bar the frame may move a given distance in one direction and means whereby when the latch is operated to disengage the bar the stop frame is moved relatively to the latch a corresponding distance in the opposite direction.

3. In stop devices adapted to arrest the movement of a typewriter carriage, a stop frame carrying a stop surface and also a latch adapted to engage a stop bar and a sliding rocking connection between the frame and latch whereby when the latch is engaged with the stop bar the frame may move a given distance in one direction and means whereby when the latch is operated to disengage the bar the frame is moved relatively to the latch a corresponding distance in the opposite direction.

4. In stop devices adapted to arrest the movement of a typewriter carriage, a stop frame having a stop surface and also a latch adapted to engage the stop bar and a sliding rocking connection between the frame and latch whereby when the latch is engaged with the stop bar the frame may move a given distance in one direction and cam means whereby when the latch is operated to disengage the bar the body is moved relatively to the latch a corresponding distance in the opposite direction.

5. In stop devices adapted to arrest the movement of a typewriter carriage, a stop frame carrying a stop surface and also a latch adapted to engage a stop bar, the latch and frame being movably connected to permit movement relatively to one another in the direction of movement of the carriage.

In testimony whereof, I have hereunto subscribed my name.

EARLE BUCKINGHAM.

Witnesses:
B. J. DOWD,
GEORGE HENKE.